United States Patent [19]
Lentz

[11] 3,947,874
[45] Mar. 30, 1976

[54] APPARATUS FOR MODIFYING THE TIME BASE OF SIGNALS

[75] Inventor: Robert A. Lentz, Del Mar, Calif.

[73] Assignee: Eastman Technology, Inc., Rochester, N.Y.

[22] Filed: Oct. 29, 1974

[21] Appl. No.: 519,359

[52] U.S. Cl. .................................................. 360/36
[51] Int. Cl.² ........................................ H04N 5/795
[58] Field of Search .................. 360/26, 27, 36, 51; 178/69.5 DC, 69.5 TV, 69.5 F, 6.6 TC; 358/4, 8, 21; 340/173 R

[56] References Cited
UNITED STATES PATENTS

| | | | |
|---|---|---|---|
| 3,197,739 | 7/1965 | Newman | 360/26 |
| 3,666,880 | 5/1972 | Krause | 360/36 |
| 3,749,837 | 7/1973 | Doughty | 360/36 |
| 3,761,646 | 9/1973 | Beauviala | 360/36 |
| 3,860,952 | 1/1975 | Tallent et al. | 358/8 |
| 3,863,022 | 1/1975 | Bruch | 360/36 |
| R25,405 | 6/1963 | Witt et al. | 360/51 |

*Primary Examiner*—Raymond F. Cardillo, Jr.
*Attorney, Agent, or Firm*—R. Cody

[57] ABSTRACT

Time base instability of signals in a train thereof is corrected by use of analog shift registers. As employed in the correction of time base instability of video signals, plural analog shift registers are used. The same clock rate is used, respectively, to clock video signals into and out of analog shift registers. The clock rate is set so that samples of a video signal which has a normal duration may load all stages of an analog shift register within the duration of the normal signal. Thus, samples of a stretched signal fully load all stages of the analog shift register, the trailing part of such stretched signal being discarded. Conversely, a video signal which has been compressed, although being fully loaded into the analog shift register, loads less than all of the analog shift register stages.

2 Claims, 2 Drawing Figures

APPARATUS FOR MODIFYING THE TIME BASE OF SIGNALS

BACKGROUND OF THE INVENTION

1. Field of the Invention

This invention relates in general to apparatus for modifying the time base of signals in a train thereof; more particularly, the invention is concerned with apparatus for correcting a time base instability in TV-type signals.

2. Description Relative to the Prior Art

While the invention is not so restricted, its utility as a flutter compensator in a video tape recorder dramatically indicates its significance. The playback of a taped video recording requires faithful replay of recorded signals without causing such signals to shift unwantedly and continuously in frequency. Unwanted frequency modulation of playback video signals can, among other things, cause (1) the sync information content of the video signal to become unstable, and (2) the color information content of the video to become, at best, faulty, i.e., color information may not be detectable at all, since unstable playback of recorded color burst information within the video signal may cause the color content of the video signal to be lost entirely.

The degree of unwanted frequency shift during playback of the video signal is measured in terms of "percent flutter", it being recognized that even fractional percent flutter will prevent the AFC circuits of most TV's from tracking the fluttering sync signal, resulting in the tearing apart of the visual display that corresponds to the playback signal. Percent flutter may be defined as 100 times a change in frequency divided by a nominal frequency, the nominal frequency in the present case being 15750 Hz.

To assure against instantaneous time base instability of played back TV signals which are derived from a video tape recorder, present practice is to employ extremely close tolerances in the precision parts of the recorder and to complement such tolerances with various servo controls which actively prevent flutter from occurring during playback. Such practices greatly add to the cost of manufacturing video tape recorders and, indeed, have prevented video recorders from being cost-wise within reach of many who would otherwise want them. This being the case, various proposals have been made to utilize variable delay lines, e.g., U.S. Pat. Nos. 2,960,568; 3,238,300; and 3,580,991, as a way to nullify flutter within playback signals: flutter within the played-back signals is detected; the "flutter" signal is then used to vary the delay of a delay line through which the fluttering signal is passed, thereby causing the output of the delay line to be, hopefully, a flutter-free equivalent of the fluttering input to the delay line.

Copending U.S. Pat. application Ser. No. 432,363, filed Jan. 10, 1974, discloses a departure from the above-noted delay line concept, having, at the heart thereof, and analog shift register. Basically, copending Ser. No. 432,363 teaches (1) the clocking (sampling) of a fluttering signal into an analog shift register at a rate dependent on the degree of flutter, and (2) the clocking of such signal samples out of such analog shift register at a desired rate. If the desired rate is constant, flutter is nullified. On the other hand, the clock-out rate may be variable, whereby the signal output of the analog shift register may be modified according to choice.

In utilizing the teaching of Ser. No. 432,363 to process signals such as TV-type signals, i.e., signals which are continuous and which have a nominal periodicity, plural analog shift registers, say two, are used and so cooperate that while one TV signal is clocked into one register at a flutter-dependent rate, the signal within the other register is clocked out of such register at a known, but stable, rate, and vice versa.

As is known, analog shift registers may take a variety of forms such, for example, as charge coupled and charge injection devices, various serially disposed sample-and-hold circuits, and even A/D and D/A converters which functionally sandwich digital shift registers.

Recognizing that time base stability in the lead portion of, say, a TV-type signal is of more consequence than time base stability in the mid or trailing parts of such a signal (i.e., the lead signal portion contains the color burst information and also critically affects horizontal synchronization of a TV set, whereas time base shift in mid or trailing signal portions causes the mere shift of visual scene content — which will frequently occur off the face of the TV, and/or be relatively unnoticeable, anyway), copending application Ser. No. 477,583, filed June 10, 1974, taught an invention which obviated the need, as in Ser. No. 432,363, for a variable frequency clock to load an analog shift register at a flutter dependent rate and, instead employed a fixed clock in combination with variable loading of an analog shift register(s). In a somewhat broad sense, then, the invention of Ser. No. 477,583 proposed the following as a way to nullify the effects of time base instability: Successively clock periodically occurring signals which may be subject to time base instability, and which have a nominal duration and periodicity, into an analog shift register by means of a fixed clock having a frequency which is just sufficient to shift the first sample of each signal to the output stage of the analog shift register within the duration of each such signal whereby, for each periodic signal, samples will appear in a number of the stages of the analog shift register in proportion to the degree that each such signal is stretched time-wise. Then, in response to a reference pulse train having time base stability, unload the analog shift register of its samples at a clock rate which will unload all stages of the analog shift register within the nominal duration, thereby causing (1) the lead part of all of the periodically occurring signals to have time base stability, and (2) those periodic signals, which before processing were stretched, to have the nominal duration after processing, all other post-processed signals having durations which are less than the nominal duration by tolerable amounts.

In a preferred embodiment of the invention of Ser. No. 477,583, as might be employed to remove flutter from a TV signal train derived from the playback of magnetic tape or the like, three analog shift registers, e.g., charge coupled devices (CCDs) are employed to store, respectively, samples of every third video line signal (which signals shall be taken to include both video and sync information) in a signal train: The first video signal is clocked into the first CCD at a first clock rate; then the second video signal is clocked into the second CCD at the first clock rate, and while such occurs, the signal in the first CCD is clocked out of the first CCD at a second rate which will assuredly clear all stages of the first CCD during the time of an unfluttered video signal; then the third video signal is clocked into the third CCD at the first clock rate, and while such occurs, the signal in the second CCD is clocked out of the second CCD at the second clock rate; then the signal in the third CCD is clocked out of the third CCD at the second clock rate, and while this occurs, the fourth video signal is clocked into the first CCD at the first clock rate, and so on. By so selecting the first clock rate that a "worst case" stretched video signal fully loads all stages of a CCD with signal samples within the duration of the worst case signal, each CCD is more or less, starting with its output stage, periodically loaded with signal samples, the number of which is in proportion to the degree of stretch that the corresponding video signal experiences. As the CCDs are successively unloaded at the horizontal sync rate, there is no flutter of the critical sync portions of the video signals clocked out of the CCDs; and whatever flutter remains within the clocked-out signals virtually unnoticeably occurs in the visual part of, and more particularly off the right-hand side of, the TV picture.

SUMMARY OF THE INVENTION

The present invention is similar to the invention of Ser. No. 477,583 in that the concept of clocking each periodic signal, so that its lead part gets stored prior to utilization thereof in the output stage of an analog shift register, is retained. However, whereas the invention of Ser. No. 477,583 operates to assure that even a worst case stretched signal is stored in an analog shift register (thus, all parts of each signal in a train thereof are analog shift register-processed with the invention of Ser. No. 477,583), the present invention teaches variable loading of an analog shift register depending on the degree of "compression" that a signal experiences with respect to a reference duration; and for signals which experience time-wise stretching, the invention teaches the variable "discarding" of those signal parts which occur after the reference duration. With such a technique, the need, as in Ser. No. 477,583, for a relatively slow clock to load an analog shift register, and a faster clock to unload the analog shift register, is obviated. Rather, apparatus according to the invention employs the same clock for clocking signals into and out of an analog shift register, the clock being sufficient to unload an analog shift register in the reference duration.

In the case of a TV-type signal, the reference duration is, typically, 63.5 microseconds; and the clock is selected so that all stages of an analog shift register to which a properly "durationed" signal is applied are loaded with samples of such signal. Therefore, were a compressed signal to be applied to the analog shift register, the lead end of the signal would be clocked to the output stage of the analog shift register, but the signal would only partially load the analog shift register. And, in the event a stretched signal is applied to the analog shift register, all of the stages of the analog shift register would be loaded, but only part of the signal would be stored. In any event, whether the signal is properly durationed, or stretched, or compressed, the critical lead (sync) part of the signal is stored at the output end of the analog shift register, ready for unfluttered clock-out thereof.

OBJECTIVES OF THE INVENTION

To provide apparatus for modifying the time base of signals.

To provide a technique for stabilizing the time base of critical signals in a train thereof and, more particularly, to provide a technique for stabilizing the time base of sync signals in a TV signal train.

To provide apparatus for nullifying the effects of flutter during the playback of recorded video information.

The invention will be described with reference to the figures, wherein.

Figure 1:
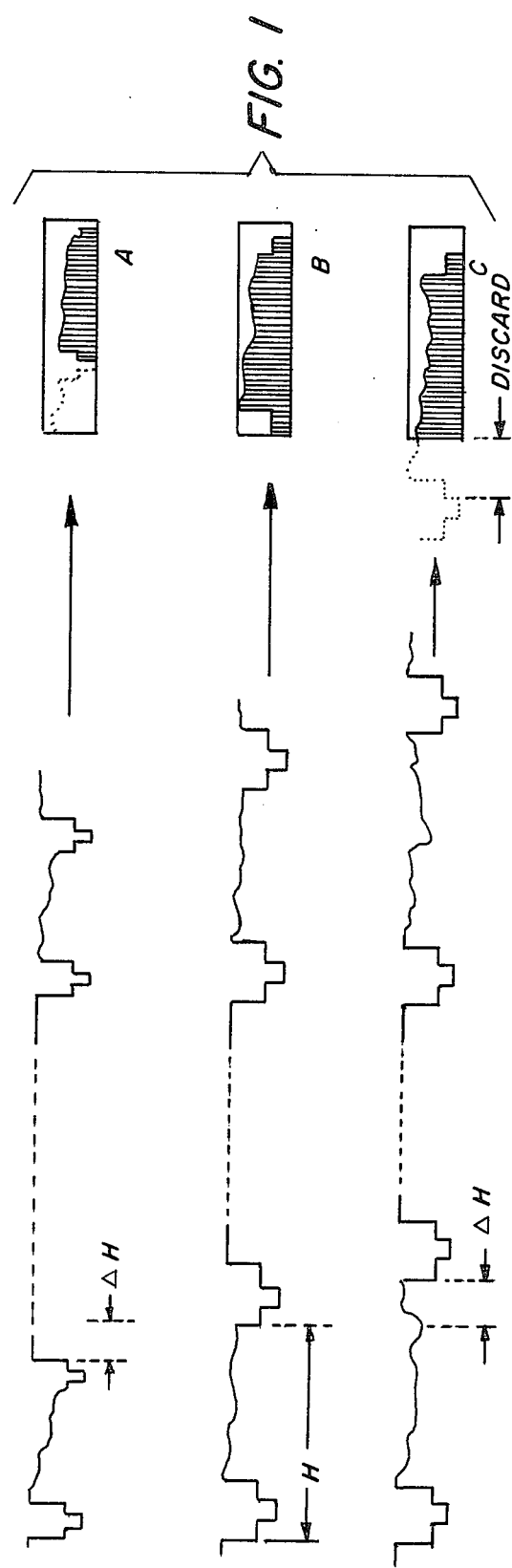
FIG. 1 is a diagram useful in describing the invention.

Before embarking on an apparatus-oriented description of the invention, the basic philosophies employed in implementing the invention will be discussed in relation to FIG. 1. A TV signal waveform is depicted as having, in succession, line signals $(H - \Delta H)$ that are compressed in duration, line signals (H) having normal durations, and line signals $(H + \Delta H)$ that are stretched in duration an amount $(\Delta H)$, which in the case of an NTSC signal format is nominally 63.5 $\mu$sec. Three analog shift registers A, B, C are pictorially indicated as storing respective samples of the compressed $(H - \Delta H)$, normal (H), and stretched $(H + \Delta H)$ signals. Given that the clock which samples and feeds the three signals respectively into the analog shift registers A, B, C is the same, and has a clock rate that is sufficient to load the normal signal fully into the analog shift register B within the duration of such signal, the compressed signal $(H - \Delta H)$ will get shifted to occupy less than all of the stages of its analog shift register A, from output end toward input end, in proportion to its duration relative to the duration of the normal signal. In the case of the stretched signal $(H + \Delta H)$, however, the clock shifts the signal so that its lead edge resides at the output stage of the analog shift register C, the clock turning off at that time so that the trailing part of the stretched signal gets discarded. With the sync-identifying start of each signal $(H - \Delta H)$, (H), and $(H + \Delta H)$ so defined by the analog shift registers, i.e., at the output stage of each analog shift register, the signals in the analog shift register are, as will be described below in detail, successively clocked out at the input clock rate, which attendantly fully unloads all stages of each analog shift register within the nominal period of the video line signal, i.e., 63.5 $\mu$sec. Thus, the sync information reappears precisely at the nominal frequency, and whatever flutter remains in the clocked-out video information content of each line signal causes, when displayed by a TV, either no apparent visual shift of scene content, or a shift which appears just behind the right-hand side of the mask found on most TV sets.

It is known that approximately 200 evenly-spaced samples of video information per horizontal scan line will provide good resolution of the TV image at normal viewing distance. Because of the relative availability of 256-stage CCDs (i.e., $256 = 2^8$), the invention employs such CCDs as analog shift registers. Assuming that a 256-stage CCD is to store a normal signal of 63.5 $\mu$sec., then 256 stages per $63.5 \times 10^{-6}$ seconds will define the frequency (4.03 Mhz.) necessary to clock such signal into, and fully load, the CCD; which is to say that a frequency of 4.03 Mhz. will shift a video signal which is compressed so that the sync portion of such signal resides at the output stage of the CCD. To unload the 256-stage CCD in 63.5 $\mu$sec. requires, naturally, a clock-out rate of 4.03 Mhz.

Figure 2:
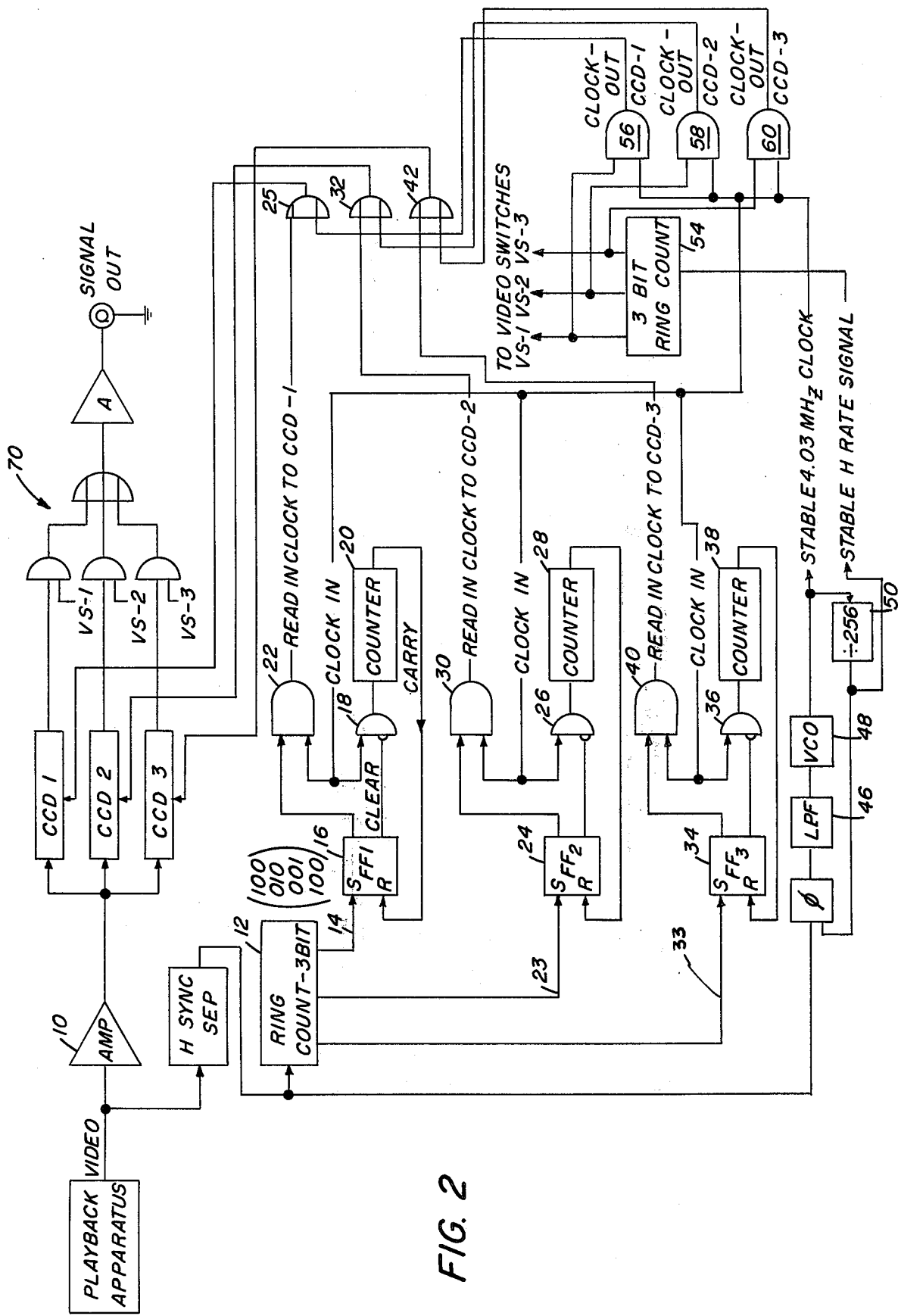
FIG. 2 is a schematic diagram illustrating a presently preferred embodiment of the invention.

Keeping in mind the clock-in/clock-out frequency as defined above, and the teaching which was characterized in relation to FIG. 1, reference should now be had to FIG. 2: A video signal train — including sync information — as may be supplied during playback of a video tape recorder, and which may be subject to flutter, is applied to first second, and third CCDs (1, 2, 3) respectively, via an amplifier 10. The syn information (sync separator 11) is also applied to a three-bit ring counter 12 which serves as a basic control for clocking discrete line representative signals in the video signal train, respectively, and successively, into the first, second, third, first, second, etc, CCDs. In other words, the output of the ring counter 12 tracks whatever flutter is in the incoming video signal train. When, for example, the ring counter 12 has an output on its lead 14, a flip-flop 16 is set, removing an INHIBIT signal from a gate 18 and causing clock-in pulses at 4.03 Mhz. to be applied to a 256-stage counter 20, and to the CCD 1 via AND and OR gates 22 and 24, respectively. As soon as 256 shift-producing pulses have been applied to the CCD 1, at which time the lead portion of the first video line signal will have been shifted to the output stage of the CCD 1, the counter 20 carry-output resets the flip-flop 16 to end the application of clock-in pulses to the CCD 1. Thus, the first video line signal gets so clocked into and shifted within the CCD 1 that the sync portion of the first video line signal lodges at the output stage of the first CCD 1, irrespective of how much the video line signal has been stretched or compressed. Similarly, the second video line signal is clocked into the second CCD 2 by means of circuit components 23, 24, 26, 28, 30, and 32; and the third video line signal is clocked into the third CCD by means of circuit components 33, 34, 36, 38, 40, and 42; after which the fourth video signal is applied to the CCD 1, and so on.

In accordance with the invention, clock-out of a CCD does not occur until the lead sync portion of each discrete video line signal is assuredly stored in the output stage of that CCD. And, such clock-out is triggered in response to a train of flutter-free sync-derived gating signals:

Troublesome flutter is effectively removed from the horizontal sync pulse output of the sync separator 11 by a low-pass filter (DC to 0.1 Hz.) 46 within a phase lock loop including a voltage controlled oscillator (VCO) 48, the output of which is divided (50) by 256 to provide a signal frequency for comparison with the fluttering output of the delay 44. Thus, the VCO 48 provides a 4.03 Mhz. output signal frequency, and the divider 50 provides an H-rate signal frequency, both signal frequencies being without troublesome flutter frequencies.

The output of the oscillator 50 is applied to operate a three-bit ring counter 54 which, unlike the flutter-influenced output of the ring counter 12, produces an output that changes at precisely the H rate. The ring counter 54, via AND gates 56, 58, 60, causes the clock (4.03 Mhz.) from the oscillator 52 to be applied successively to the CCDs 1, 2, 3, via OR gates 25, 32, 42, whereby each CCD gets fully unloaded, via logic 70, in the 63.5 $\mu$sec. which occurs between the signals produced by the oscillator 50; and since each CCD unloads the lead portion of its stored sync signal at precisely the H rate, flutter is efficiently removed from the critical sync portion of each CCD-processed video signal. Indeed, by means of the invention, a TV responsive to such CCD-unloading will appear to embody a "driven" sync circuit. As noted above, those portions of video signals which are stored in CCD stages nearest the CCD inputs cause, when clocked out, only slight and relatively unnoticeable shift of visual scene content which, as stated above, will ordinarily occur behind the right-hand side of the mask found on most TV sets.

The invention has been described in detail with particular reference to preferred embodiments thereof, but it will be understood that variations and modifications can be effected within the spirit and scope of the invention. For example, in the case of a signal which is subject to time-wise compression, the sync pulse corresponding to the next subsequent line signal may — unless steps are taken to prevent it — get stored in the CCD. This could prove to be a nuisance and, if so, a blanking circuit could easily be incorporated in the circuit of FIG. 2 to block, say, the last five percent of each line signal from appearing in the output of the FIG. 2 circuit.

What is claimed is:

1. Apparatus for removing flutter from video signals having a nominal periodicity, said apparatus comprising:
    a. a plurality of analog shift registers;
    b. means for successively clocking video signals into said analog shift registers at a rate sufficient to load an analog shift register fully with samples of a video signal that has a predetermined normal duration within the duration of said signal;
    c. means for clocking video signals out of said analog shift registers, said clock-out rate being the same as said clock-in rate; and
    d. logic means cooperative with said analog shift registers for enabling samples of one video signal to be clocked into one analog shift register and for simultaneously enabling signal samples of a previously occurring video signal which are stored within another analog shift register to be clocked out of said other analog shift register.

2. The apparatus of claim 1 wherein said analog shift registers are charge coupled devices.

* * * * *